(12) United States Patent  (10) Patent No.: US 11,896,894 B2
Wu                        (45) Date of Patent:     Feb. 13, 2024

(54) CONTROL METHOD AND APPARATUS FOR HANDLE CONTROL, AND HEAD MOUNTED DISPLAY (71) Applicant: QINGDAO PICO TECHNOLOGY CO., LTD., Shandon (CN)

(72) Inventor: Tao Wu, Shandong (CN)

(73) Assignee: QINGDAO PICO TECHNOLOGY CO., LTD.

( * ) Notice: Subject to any disclaimer, the term of this patent is extended or adjusted under 35 U.S.C. 154(b) by 0 days.

(21) Appl. No.: 17/880,750

(22) Filed: Aug. 4, 2022

(65) Prior Publication Data

US 2022/0370895 A1   Nov. 24, 2022

Related U.S. Application Data (63) Continuation of application No. PCT/CN2021/118549, filed on Sep. 15, 2021.

(30) Foreign Application Priority Data

Apr. 27, 2021 (CN) .......................... 202110459625.4

(51) Int. Cl.
  *A63F 13/24*   (2014.01)
  *A63F 13/211*  (2014.01)
  *A63F 13/213*  (2014.01)
(52) U.S. Cl.
  CPC ............ *A63F 13/24* (2014.09); *A63F 13/211* (2014.09); *A63F 13/213* (2014.09); *A63F 2300/8082* (2013.01)
(58) Field of Classification Search
  CPC ....... A63F 13/24; A63F 13/211; A63F 13/213
  See application file for complete search history.

(56) References Cited

U.S. PATENT DOCUMENTS

| 8,323,106 B2 * | 12/2012 | Zalewski | ............... A63F 13/215 463/31 |
| 2011/0294579 A1 * | 12/2011 | Marks | .................... H04N 13/10 463/36 |

(Continued)

FOREIGN PATENT DOCUMENTS

| CN | 104113680 A | 10/2014 |
| CN | 105117016 A | 12/2015 |

(Continued)

OTHER PUBLICATIONS

First Office Action dated Jul. 14, 2022 in Chinese Application No. 202110459625.4, with English translation (19 pages).

(Continued)

*Primary Examiner* — David L Lewis
*Assistant Examiner* — Shauna-Kay N. Hall (57) ABSTRACT

Examples are disclosed that relate to controlling of a handle controller in the technical field of virtual reality. In an example, the handle controller includes a handle body and a plurality of light-emitting units coupled to the surface of the handle body, and a method includes: acquiring tracking information obtained by tracking the handle controller in a first time period, wherein the tracking information includes: pose information, position information and acceleration; predicting the motion information of the handle controller in a second time period according to the tracking information, wherein the second time period is located after the first time period; and adjusting the parameter values of light-emitting parameters of the plurality of light-emitting units in the second time period according to the motion information.

19 Claims, 3 Drawing Sheets

(56) References Cited

U.S. PATENT DOCUMENTS

| | | | | |
|---|---|---|---|---|
| 2016/0307332 A1* | 10/2016 | Ranjan | ............... | A63F 13/213 |
| 2016/0357261 A1* | 12/2016 | Bristol | ............... | G06F 1/1686 |
| 2016/0364910 A1* | 12/2016 | Higgins | ............... | A63F 13/24 |
| 2017/0173453 A1* | 6/2017 | Huang | ............... | G06F 3/011 |
| 2018/0190010 A1* | 7/2018 | Sawaki | ............... | G06F 3/011 |
| 2018/0329484 A1* | 11/2018 | Steedly | ............... | G02B 27/017 |
| 2018/0329517 A1* | 11/2018 | Steedly | ............... | G06F 3/0346 |
| 2019/0012835 A1* | 1/2019 | Bleyer | ............... | G06T 19/006 |
| 2019/0087019 A1* | 3/2019 | Raja | ............... | G06T 19/006 |
| 2019/0318501 A1* | 10/2019 | Balan | ............... | A63F 13/212 |
| 2019/0325274 A1 | 10/2019 | Balan et al. | | |
| 2019/0325600 A1* | 10/2019 | Balan | ............... | G06F 3/011 |
| 2020/0168181 A1 | 5/2020 | Lin et al. | | |
| 2020/0348750 A1* | 11/2020 | Selan | ............... | G09G 3/3426 |
| 2021/0072823 A1* | 3/2021 | Selan | ............... | G09G 3/3426 |

FOREIGN PATENT DOCUMENTS

| | | | |
|---|---|---|---|
| CN | 110612506 A | | 12/2019 |
| CN | 110837295 A | | 2/2020 |
| CN | 111174683 A | | 5/2020 |
| CN | 112451962 A | | 3/2021 |
| CN | 113318435 A | | 8/2021 |
| WO | WO2019122950 A1 | | 6/2019 |

OTHER PUBLICATIONS

International Search Report dated Jan. 26, 2022 in International Application No. PCT/CN2021/118549.

* cited by examiner

CONTROL METHOD AND APPARATUS FOR HANDLE CONTROL, AND HEAD MOUNTED DISPLAY

CROSS-REFERENCE TO RELATED APPLICATION

The present disclosure is a continuation of International Application No PCT/2021/118549 filed on Sep. 15, 2021, which claims the priority of Chinese Application 202110459625.4, filed in the Chinese Patent Office on Apr. 27, 2021, and entitled "CONTROL METHOD AND APPARATUS FOR HANDLE CONTROLLER, AND HEAD MOUNTED DISPLAY", the entire contents of which are herein incorporated by reference.

TECHNICAL FIELD

Embodiments of the present disclosure relate to the technical field of virtual reality, and more specifically, to a control method and apparatus for a handle controller, a head mounted display and a computer readable storage medium.

BACKGROUND

A head mounted display (Head Mounted Display, HMD) is a display that can be worn on the head of a user and can realize different effects such as virtual reality (Virtual Reality, VR), augmented reality (Augmented Reality, AR), and mixed reality (Mixed Reality, MR). The HMD can be used in conjunction with a handle controller, during this process, a scenario of virtual reality, augmented reality or mixed reality is presented on the HMD, and the user interacts with elements in the above-mentioned scenario by controlling the handle controller that is held in a hand.

In actual situations, from the perspective of ergonomics, in order to make the handle controller as comfortable and convenient as possible in use, it is necessary to perform a miniaturization design on the handle controller, so as to reduce the volume of the handle controller as much as possible.

SUMMARY

One purpose of an embodiment of the present disclosure is to provide a new technical solution for controlling a handle controller.

According to a first aspect of the present disclosure, a control method for a handle controller is provided, which is applied to a head mounted display used in conjunction with the handle controller, the handle controller includes a handle body and a plurality of light-emitting units coupled to a surface of the handle body, and the method includes: acquiring tracking information obtained by tracking the handle controller in a first time period, wherein the tracking information includes: pose information, position information and acceleration; predicting motion information of the handle controller in a second time period according to the tracking information, wherein the second time period is located after the first time period; and adjusting parameter values of light-emitting parameters of the plurality of light-emitting units in the second time period according to the motion information.

Optionally, the motion information includes a motion position, and the light-emitting parameters include a light-emitting time length; the adjusting the parameter values of the light-emitting parameters of the plurality of light-emitting units in the second time period according to the motion information includes: acquiring a tracking distance between a preset reference point in the head mounted display and the motion position; acquiring, according to the tracking distance and a preset corresponding relationship between a distance range and the light-emitting time length, a target light-emitting time length corresponding to a target distance range in which the tracking distance falls, wherein in the preset corresponding relationship between the distance range and the light-emitting time length, the light-emitting time length corresponding to each distance range is less than or equal to the light-emitting time length of the plurality of light-emitting units under each condition that the head mounted display has tracked the handle controller under the distance range; and adjusting the light-emitting time length of the plurality of light-emitting units to the target light-emitting time length in the second time period.

Optionally, the length of the distance range is less than or equal to 30 cm.

Optionally, the motion information includes: a target a target angle between a first direction in which a preset reference point in the head mounted display points to the handle controller and a second direction in which a front surface of a display screen in the head mounted display points to a back surface; and the adjusting the parameter values of the light-emitting parameters of the plurality of light-emitting units in the second time period according to the motion information includes: in a case where the target angle is within a preset hidden viewing angle range, adjusting the light-emitting time length of the plurality of light-emitting units to zero in the second time period.

Optionally, the hidden viewing angle range is 200° to 360°.

Optionally, the motion information includes: a motion speed; and adjusting the parameter values of the light-emitting parameters of the plurality of light-emitting units in the second time period according to the motion information includes: in a case where the motion speed is less than a preset speed threshold, reducing the light-emitting frequency of the plurality of light-emitting units.

Optionally, reducing the light-emitting frequency of the plurality of light-emitting units includes: reducing the light-emitting frequency of the plurality of light-emitting units to preset frequency, wherein a frequency range of the preset frequency is 0 HZ to 15 HZ.

According to a second aspect of the present disclosure, a control apparatus for a handle controller is further provided, which is applied to a head mounted display used in conjunction with the handle controller, the handle controller includes a handle body and a plurality of light-emitting units coupled to a surface of the handle body, and the apparatus includes: an acquisition module, configured to acquire tracking information of the handle controller in a first time period, wherein the tracking information includes: pose information, position information and acceleration; a processing module, configured to predict motion information of the handle controller in a second time period according to the tracking information, wherein the second time period is after the first time period; and an adjusting module, configured to adjust parameter values of light-emitting parameters of the plurality of light-emitting units in the second time period according to the motion information.

Optionally, the motion information includes a motion position, and the light-emitting parameters include a light-emitting time length; and the adjusting module is specifically configured to: acquire a tracking distance between a preset reference point in the head mounted display and the motion position; acquire a target light-emitting time length corresponding to a target distance range where the tracking distance is located according to the tracking distance and a corresponding relationship between a preset distance range and the light-emitting time length, wherein in the corresponding relationship between the preset distance range and the light-emitting time length, the light-emitting time length corresponding to each distance range is less than or equal to the light-emitting time length of the plurality of light-emitting units under each condition of the head mounted display while tracking the handle controller in the distance range; and adjust the light-emitting time length of the plurality of light-emitting units to the target light-emitting time length in the second time period.

Optionally, the length of the distance range is less than or equal to 30 cm.

Optionally, the motion information includes: a target angle between a first direction where the preset reference point in the head mounted display points to the handle controller and a second direction where the front surface of a display screen in the head mounted display points to the back surface; and the adjusting module is specifically configured to: in a case where the target angle is within a preset hidden viewing angle range, adjust the light-emitting time length of the plurality of light-emitting units to zero in the second time period.

Optionally, the hidden viewing angle range is 200° to 360°.

Optionally, the motion information includes: a motion speed; and the adjusting module is specifically configured to: in a case where the motion speed is less than a preset speed threshold, reduce the light-emitting frequency of the plurality of light-emitting units.

Optionally, the adjusting module is specifically configured to: reduce the light-emitting frequency of the plurality of light-emitting units to preset frequency, wherein a frequency range of the preset frequency is 0 HZ to 15 HZ.

According to a third aspect of the present disclosure, a head mounted display is further provided, including a memory and a processor, wherein the memory is used for storing a computer program; and the processor is used for executing the computer program to implement the method in the first aspect of the present disclosure.

According to a fourth aspect of the present disclosure, a computer readable storage medium is further provided, wherein a computer program is stored on the computer readable storage medium, and when executed by a processor, the computer program implements the method in the first aspect of the present disclosure.

The control method for the handle tracking controller provided by the embodiment of the present disclosure can be applied to the head mounted display used in conjunction with the handle controller, the handle controller includes the handle body and the plurality of light-emitting units coupled to the surface of the handle body, the embodiment of the present disclosure can acquire the tracking information obtained by tracking the handle controller in the first time period, wherein the tracking information includes: the pose information, the position information and the acceleration, and then the motion information of the handle controller in the second time period is predicted according to the above tracking information, wherein the second time period is located after the first time period, and finally, the parameter values of the light-emitting parameters of the plurality of light-emitting units in the second time period are adjusted according to the motion information, so as to adjust the power consumption on the handle controller, in this way, under the premise of not affecting the normal use of the handle controller by the user, the heat generated on the handle controller is reduced by adjusting the power consumption of the handle controller, such that the heat generated on the handle controller can be adapted to the needs of miniaturization design.

By means of the following detailed descriptions of exemplary embodiments of the present disclosure with reference to the drawings, other features of the embodiments of the present disclosure and advantages thereof will become clear.

BRIEF DESCRIPTION OF THE DRAWINGS

The drawings, which are incorporated in the specification and constitute a part of the specification, illustrate the embodiments of the present disclosure, and together with the descriptions thereof, serve to explain the principles of the embodiments of the present disclosure.

DETAILED DESCRIPTION OF THE EMBODIMENTS

Various exemplary embodiments of the present disclosure will now be described in detail with reference to the drawings. It should be noted that: unless specifically stated otherwise, the relative arrangement of components and steps, numerical expressions and numerical values set forth in these embodiments do not limit the scope of the present invention.

The following description of at least one exemplary embodiment is actually only illustrative, and in no way serves as any limitation to the present invention and its application or use.

The techniques, methods and devices known to those of ordinary skill in relevant arts may not be discussed in detail, but where appropriate, the techniques, methods and devices should be regarded as a part of the specification.

In all the examples shown and discussed herein, any specific value should be interpreted as merely exemplary, rather than as a limitation. Therefore, other examples of the exemplary embodiment may have different values.

It should be noted that: similar reference numerals and letters indicate similar items in the following drawings, and therefore, once a certain item is defined in one drawing, it does not need to be further discussed in the subsequent drawings.

In the process of performing a miniaturization design on a handle controller, the superficial area the handle controller is reduced accordingly in general due to the reduction in the volume of the the handle controller, therefore a heat dissipation area available for heat dissipation on the handle controller becomes smaller, such that the heat dissipation performance becomes worse. For a user who holds the handle controller, the hand of the user holding the handle controller will directly touch a part of the surface on the handle controller, in this case, the heat generated on the handle controller will be transferred to the skin of the hand of the user through the above-mentioned part of surface, thus causing discomfort to the user.

In order to avoid the occurrence of the above-mentioned situation, in the process of performing the miniaturization design on the handle controller, it is necessary to consider how to reduce the heat generated by the handle controller during use.

At present, most of the heat generated by the handle controller during use comes from a battery and a processor in the handle controller. In order to reduce the heat generated on the battery, under the premise of ensuring that the volume of the battery is as small as possible and the standby time is as long as possible, and considering the production cost, the life of the battery can only be sacrificed, that is, the service life of the battery is reduced; and in order to reduce the heat generated on the processor, the computing power of the processor needs to be sacrificed (for example, the floating-point operations per second performed by the processor (unit: floating-point operations per second, abbreviated as FLOPS in English)), that is, the computing power of the processor is reduced.

However, the reduction in the service life of the battery and the computing power of the processor will affect the performance of the handle controller, resulting in poor performance of the handle controller.

Based on the above-mentioned problems, an embodiment of the present disclosure provides a new technical solution for controlling a handle controller, so as to achieve the purpose of effectively reducing the heat generated on the handle controller while reducing the volume of the handle controller.

Implementation Environment and Hardware Configuration

Figure 1:
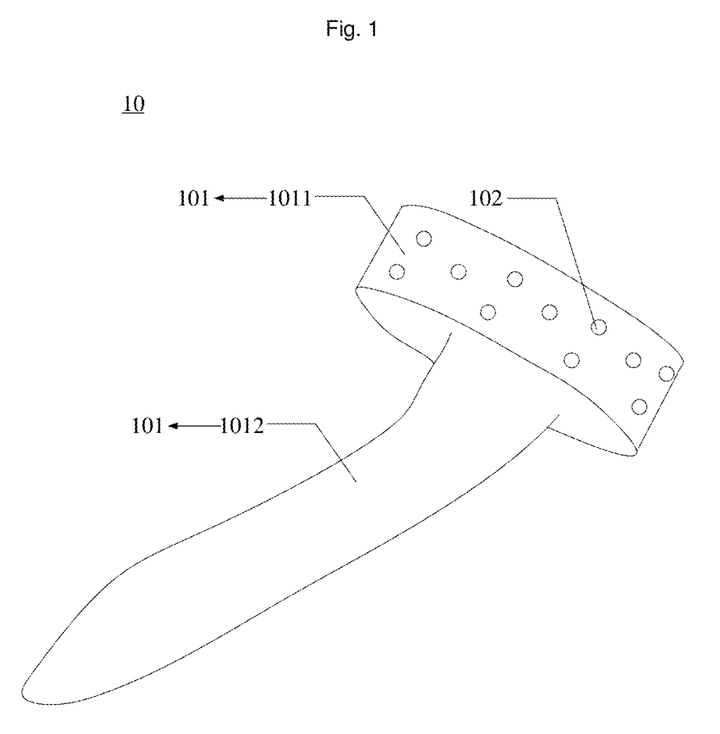
FIG. 1 is a schematic structural diagram of a handle controller in an embodiment of the present disclosure.

FIG. 1 shows a schematic structural diagram of a handle controller according to an embodiment of the present disclosure. As shown in FIG. 1, the handle controller 10 includes a handle body 101 and a plurality of light-emitting units 102 coupled to the surface of the handle body 101.

Exemplarily, as shown in FIG. 1, the handle body 101 includes an end portion 1011 and a handheld portion 1012, and the plurality of light-emitting units are coupled to the surface of the end portion 1011. A plurality of light-emitting mark positions (not shown in FIG. 1) can be coupled to the surface of the end portion 1011, and a light-emitting unit 102 is coupled to each light-emitting mark position.

The arrangement manner of the plurality of light-emitting mark positions can be set by those skilled in the art according to actual situations, which is not limited in the embodiment of the present disclosure.

Exemplarily, the plurality of light-emitting mark positions include 24 light-emitting mark positions.

Exemplarily, the light-emitting unit 102 is a light-emitting diode (light-emitting diode, LED).

The light-emitting unit 102 is used for emitting detection light. The wavelength of the detection light is, for example, in the range of 420 nm to 690 nm; or, the wavelength of the detection light is, for example, in the range of 780 nm to 1100 nm, such as 850 nm or 940 nm.

For example, the plurality of light-emitting units 102 are in a light-emitting state at the same time while working (that is, the light-emitting units emit light); or the plurality of light-emitting units 102 are in an extinguished state at the same time (that is, the light-emitting units do not emit light).

The light-emitting units 102 are started at the same time to emit light according to a preset duty ratio, and the light-emitting time length is in the range of 15 µs to 150 µs. The above-mentioned preset duty ratio is, for example, 40%.

In a case where the plurality of light-emitting units 102 are in the light-emitting state at the same time, the same frame of picture is correspondingly displayed in the head mounted display.

Figure 2:
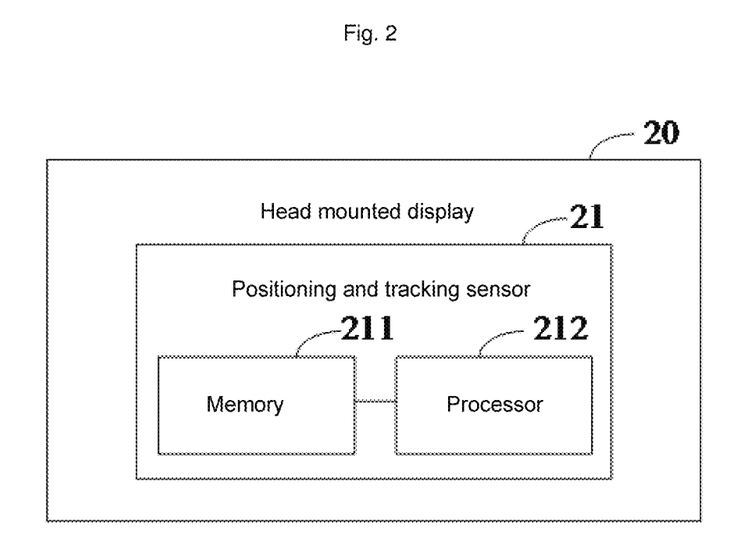
FIG. 2 is a block diagram of a functional structure of a headed mounted display in an embodiment of the present disclosure.

FIG. 2 shows a block diagram of a functional structure of a headed mounted display according to an embodiment of the present disclosure. As shown in FIG. 2, the headed mounted display 20 includes: a positioning and tracking sensor 21.

As shown in FIG. 2, the positioning and tracking sensor 21 includes a memory 211 and a processor 212. Applied to the embodiment of the present disclosure, the memory 211 of the headed mounted display 20 is used for storing a computer program, and the computer program is used for controlling the processor 212 of the headed mounted display 20 to perform operations, so as to implement a control method for a hand control tracker according to any embodiment in the present disclosure. Those skilled in the art can design the computer program according to the solution in the embodiment in the present disclosure. How the computer program controls the processor 212 to perform operations is well known in the art, so it will not be described in detail here.

In some examples, an inertial navigation unit (not shown in FIG. 1) for tracking acceleration data is built in the headed mounted display.

Hereinafter, various embodiments and examples according to the present invention will be described with reference to the drawings.

Method Embodiment

Figure 3:
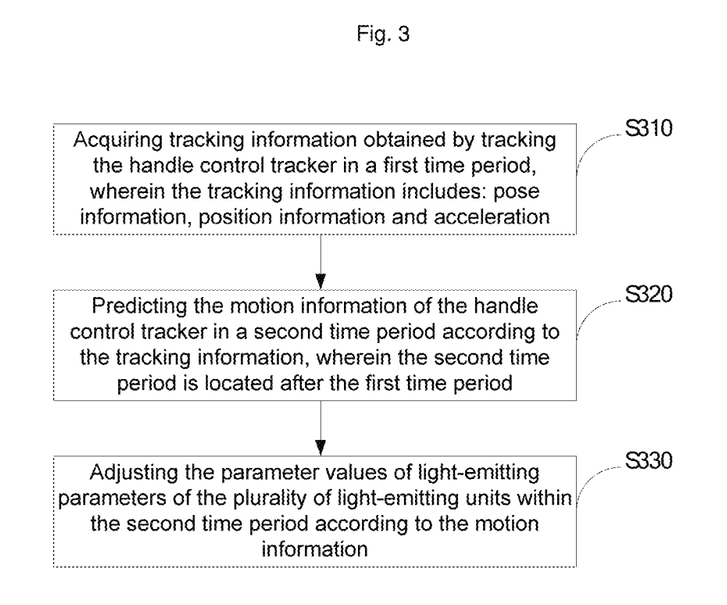
FIG. 3 is a method flow diagram of a control method for a handle controller in an embodiment of the present disclosure.

FIG. 3 is a method flow diagram of a control method for a handle controller provided according to an embodiment of the present disclosure. As shown in FIG. 3, the method includes the following steps S310 to S330:

Step S310: acquire tracking information obtained by tracking the handle controller in a first time period, wherein the tracking information includes: pose information, position information and acceleration.

The pose information is information related to pose. For example, the pose information can include rotation angles in three rotation planes, wherein the three rotation planes are perpendicular to each other. The pose information of the handle controller is the rotation angles that occur in the three rotation planes when the pose of the handle controller changes.

Of course, it can be understood that, the pose information can also include rotation angles in a plurality of rotation planes, which is more than three, so as to improve the accuracy of pose determination.

The position information is information related to position. For example, it can be information representing a spatial position, for example, coordinates in a three-dimensional space coordinate system.

In actual situations, the 6DoF (Six degrees of freedom tracking) information of the handle controller can be acquired, and the above-mentioned pose information and position information can be obtained according to an acquisition result.

Exemplarily, the acceleration includes accelerations in a first direction, a second direction and a third direction. Each two of the first direction, the second direction and the third direction are perpendicular to each other. The above-mentioned acceleration can be obtained by the inertial navigation unit.

Step S320: predict the motion information of the handle controller in a second time period according to the tracking information, wherein the second time period is after the first time period.

In some embodiments, the motion information includes a motion position. The motion position is: the spatial position where the handle controller is located, which can be specifically coordinates in the three-dimensional space coordinate system.

In step S320, according to first position information and second position information, which are obtained by tracking the handle controller in the first time period, a first time point corresponding to the first position information (for example, a starting time point of the first time period), and a second time point corresponding to the second position information, for example, an ending time point of the first time period, the motion speed of the handle controller (for example, an average speed of the handle controller in the second time period) can be obtained, and the motion position of the handle controller in the second time period is predicted according to the motion speed, the position information and the acceleration of the handle controller.

Exemplarily, the first position information is $(x_1, y_1, z_1)$, the second position information is $(x_2, y_2, z_2)$, the first time point is t1, and the second time point is $t_2$, wherein $t_2 > t_1$. When the motion speed is acquired, the distance between the first position information and the second position information can be obtained according to the first position information and the second position information, and this distance is taken as a first displacement s of the handle controller, the corresponding time for generating the above-mentioned first displacement s on the handle controller is $t = t_2 - t_1$, and the motion speed of the handle controller is $v = s/t$.

After the motion speed of the handle controller is obtained, a possible second displacement of the handle in the second time period can be calculated according to the motion speed and the acceleration tracked in step S310, and the motion position corresponding to each time point of the handle in the second time period is obtained according to the position information of the handle in the first time period and the above-mentioned second displacement.

In some embodiments, the motion information includes: a target angle between a first target direction where a preset reference point in the head mounted display points to the handle controller and a second target direction where the front surface of a display screen in the head mounted display points to the back surface. The above-mentioned preset reference point is, for example, a point on the position where the positioning and tracking sensor is located in the headed mounted display.

Exemplarily, position coordinates obtained by the tracking handle controller in the first time period are acquired, and the direction where the preset reference point in the headed mounted display points to the position coordinates is taken as the first target direction. Then, the included angle between the first target direction and the second target direction is obtained to serve as the target angle.

The manner of acquiring the included angle between the first target direction and the second target direction is set by those skilled in the art according to actual situations, which is not limited in the embodiment of the present disclosure.

In some embodiments, the motion information includes a motion speed. For the process of acquiring the motion speed, reference can be made to the corresponding introduction on the process of acquiring the motion speed in the above-mentioned embodiment, which will not be repeated here.

In the embodiment of the present disclosure, the above-mentioned motion information can be acquired periodically. In this case, the time length of the second time period (hereinafter, the time length is referred to as time length) is the same as the time length of the first time period.

Exemplarily, in a case where the first time period is the current cycle, the second time period is the next cycle; and in a case where the first time period is a historical cycle (a previous cycle), the second time period is the current cycle.

The time lengths of the first time period and the second time period can be set by those skilled in the art according to actual situations, which is not limited in the embodiment of the present disclosure.

Step S330: adjust the parameter values of light-emitting parameters of the plurality of light-emitting units in the second time period according to the motion information.

Figure 4:
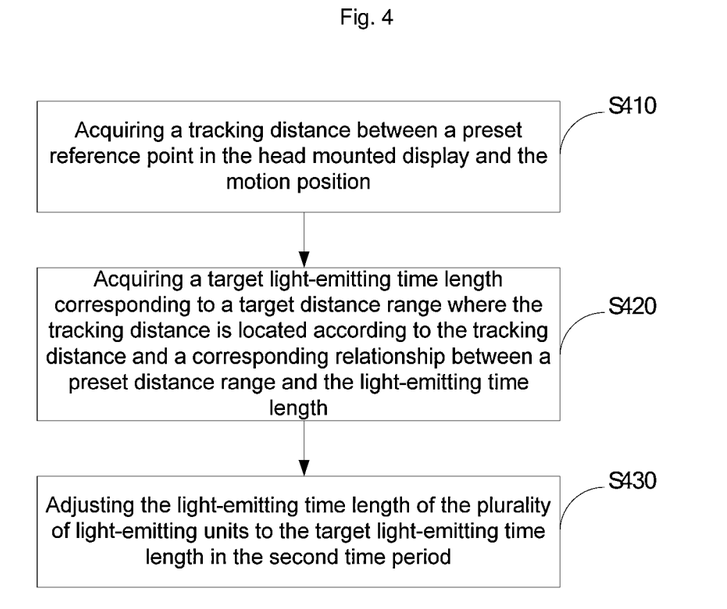
FIG. 4 is a method flow diagram of a control method for another handle controller in an embodiment of the present disclosure.

In some embodiments, in a case where the motion information is the motion position, the light-emitting parameters include a light-emitting time length. In this case, as shown in FIG. 4, the execution process of step S330 can include the following steps S410 to S430:

Step S410: acquire a tracking distance between the preset reference point in the head mounted display and the motion position.

The preset reference point in the headed mounted display and the above-mentioned motion position can be mapped in a preset three-dimensional space coordinate system, and according to first coordinates of the preset reference point in the three-dimensional space coordinate system and second coordinates of the motion position in the three-dimensional space coordinate system, the distance between the first coordinates and the second coordinates is acquired as the above-mentioned tracking distance.

Step S420: acquire a target light-emitting time length corresponding to a target distance range where the tracking distance is located according to the tracking distance and a corresponding relationship between a preset distance range and the light-emitting time length.

Under normal conditions, the tracking distance of the handle controller has a maximum distance and a minimum distance, so the tracking distance of the handle controller corresponds to a distance range. In this case, the distance range can be divided into a plurality of preset distance ranges, and each distance range has the same length. The distance range can be less than or equal to 30 cm in length.

The number of the plurality of preset distance ranges can be set by those skilled in the art according to actual situations, which is not limited in the embodiment of the present disclosure.

Exemplarily, the tracking distance range of the handle controller is 3 cm to 150 cm, the distance range is divided into 5 preset distance ranges, and the length of each preset distance range is 30 cm. The five preset distance ranges include a first distance range, a second distance range, a third distance range, a fourth distance range and a fifth distance range, the first distance range corresponding to the first distance range is 3 cm to 30 cm, the second distance range corresponding to the second distance range is 31 cm to 60 cm, the third distance range corresponding to the third distance range is 61 cm to 90 cm, the fourth distance range corresponding to the fourth distance range is 91 cm to 120 cm, and the fifth distance range corresponding to the fifth distance range is 121 cm to 150 cm.

In the corresponding relationship between the preset distance range and the light-emitting time length, the light-emitting time length corresponding to each distance range is less than or equal to the light-emitting time length of the plurality of light-emitting units under each condition of the head mounted display while tracking the handle controller in the distance range. The corresponding relationship between the preset distance range and the light-emitting time length can be obtained by those skilled in the art according to a measurement result of the actual distance range and the light-emitting time length.

In step S420, according to the tracking distance acquired in step S410, the distance range including the tracking distance (that is, the distance range where the tracking distance is located) is taken as the target distance range.

For example, if the tracking distance is 15 cm, the target distance range is the above-mentioned first distance range. As another example, if the tracking distance is 36 cm, the target distance range is the above-mentioned second distance range.

Step S430: adjust the light-emitting time length of the plurality of light-emitting units to the target light-emitting time length in the second time period.

In the second time period, the light-emitting time length of the plurality of light-emitting units is adjusted to the target light-emitting time length, so that in the second time period, the light-emitting time length of the plurality of light-emitting units is less than or equal to the light-emitting time length of the plurality of light-emitting units under each condition of the head mounted display while tracking the handle controller, the power consumption of the plurality of light-emitting units is reduced, and the purpose of reducing the heat generated on the plurality of light-emitting units is achieved.

In some embodiments, in a case where the motion information is the target angle, in step S330, it can be determined whether the target angle is within a preset hidden viewing angle range. The hidden viewing angle range refers to the viewing angle range of the user in a case where the sight of the user cannot track the handle controller (for example, the handle controller is located behind the user). If the determination result is yes, that is, the target angle is within the preset hidden viewing angle range, it means that the handle controller is not within the sight range of the user at this time, then the light-emitting time length of the plurality of light-emitting units is adjusted to zero in the second time period, that is, the plurality of light-emitting units are adjusted to the extinguished state, so as to reduce the power consumption of the plurality of light-emitting units, and to achieve the purpose of reducing the heat generated on the plurality of light-emitting units. If the determination result is no, no processing is performed on the plurality of light-emitting units.

Exemplarily, the hidden viewing angle range is 200° to 360°.

In some embodiments, the motion information is the motion speed, and in this case, in step S330, it can be determined whether the motion speed is less than a preset speed threshold. The preset speed threshold can be a speed when the handle controller is in a static state or is basically in the static state. The preset speed threshold is set by those skilled in the art according to actual situations, which is not limited in the embodiment of the present disclosure.

If the determination result is yes, that is, the motion speed is less than the preset speed threshold, it means that the handle controller is in the static state or is basically in the static state at this time, and the position of the handle controller does not change or does not change basically, in this case, the light-emitting frequency of the light-emitting units is reduced, so as to reduce the power consumption of the plurality of light-emitting units, and to achieve the purpose of reducing the heat generated on the plurality of light-emitting units. If the determination result is no, no processing is performed on the plurality of light-emitting units.

In some examples, the reducing the light-emitting frequency of the plurality of light-emitting units can specifically include: reducing the light-emitting frequency of the plurality of light-emitting units to preset frequency. The frequency range of the above-mentioned preset frequency is, for example, 0-15 HZ.

In the embodiment of the present disclosure, it can be applied to the head mounted display used in conjunction with the handle controller, the above-mentioned handle controller includes the handle body and the plurality of light-emitting units coupled to the surface of the handle body, the embodiment of the present disclosure can acquire the tracking information obtained by tracking the handle controller in the first time period, wherein the tracking information includes: the pose information, the position information and the acceleration, then the motion information of the handle controller in the second time period is predicted according to the above-mentioned tracking information and the acceleration, wherein the second time period is located after the first time period, and finally, the parameter values of the light-emitting parameters of the plurality of light-emitting units in the second time period are adjusted according to the motion information, so as to adjust the power consumption on the handle controller, in this way, under the premise of not affecting the normal use of the handle controller by the user, the heat generated on the handle controller is reduced by adjusting the power consumption of the handle controller, such that the heat generated on the handle controller can be adapted to the needs of miniaturization design.

Device Embodiment

Figure 5:
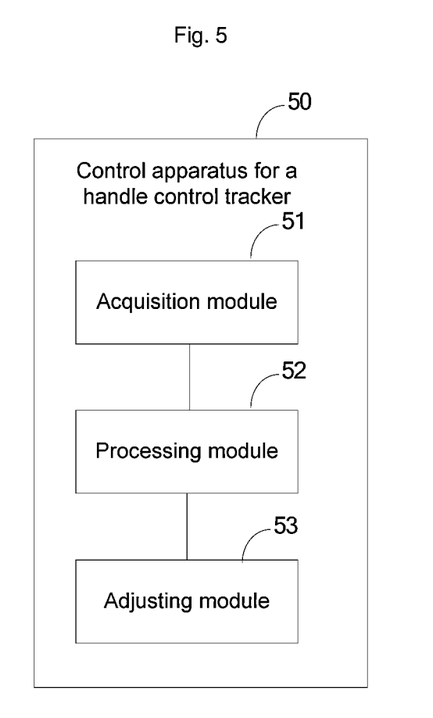
FIG. 5 is a block diagram of a functional structure of a control apparatus for another handle controller in an embodiment of the present disclosure.

FIG. 5 is a block diagram of a functional structure of a control apparatus for a handle controller provided according to some embodiments of the present disclosure. The control apparatus for the handle controller is applied to, for example, a head mounted display 12 used in conjunction with the above-mentioned handle controller 10.

As shown in FIG. 5, the control apparatus 50 for the handle controller includes an acquisition module 51, a processing module 52 and an adjusting module 53.

The acquisition module 51 is configured to acquire tracking information of the handle controller in a first time period, wherein the tracking information includes: pose information, position information and acceleration.

The processing module 52 is configured to predict the motion information of the handle controller in a second time period according to the tracking information acquired by the acquisition module 51, wherein the second time period is located after the first time period.

The adjusting module 53 is configured to adjust the parameter values of light-emitting parameters of the plurality of light-emitting units in the second time period according to the motion information acquired by the processing module 52.

Optionally, the motion information includes a motion position, and the light-emitting parameters include a light-emitting time length; and the adjusting module is specifically configured to: acquire a tracking distance between a preset reference point in the head mounted display and the motion position; acquire a target light-emitting time length corresponding to a target distance range where the tracking distance is located according to the tracking distance and a corresponding relationship between a preset distance range and the light-emitting time length, wherein in the corresponding relationship between the preset distance range and the light-emitting time length, the light-emitting time length corresponding to each distance range is less than or equal to the light-emitting time length of the plurality of light-emitting units under each condition of the head mounted display while tracking the handle controller in the distance range; and adjust the light-emitting time length of the plurality of light-emitting units to the target light-emitting time length in the second time period.

Optionally, the length of the distance range is less than or equal to 30 cm.

Optionally, the motion information includes: a target angle between a first direction where the preset reference point in the head mounted display points to the handle controller and a second direction where the front surface of a display screen in the head mounted display points to the back surface; and the adjusting module is specifically configured to: in a case where the target angle is within a preset hidden viewing angle range, adjust the light-emitting time length of the plurality of light-emitting units to zero in the second time period.

Optionally, the hidden viewing angle range is 200° to 360°.

Optionally, the motion information includes: a motion speed; and the adjusting module is specifically configured to: in a case where the motion speed is less than a preset speed threshold, reduce the light-emitting frequency of the plurality of light-emitting units.

Optionally, the adjusting module is specifically configured to: reduce the light-emitting frequency of the plurality of light-emitting units to preset frequency, wherein the frequency range of the preset frequency is 0-15 HZ.

The above modules can be implemented by the processor 212 in this embodiment by executing the computer program stored in the memory 211, or can be implemented by other circuit structures, which are not limited here.

In the embodiment of the present disclosure, it can be applied to the head mounted display used in conjunction with the handle controller, the above-mentioned handle controller includes the handle body and the plurality of light-emitting units coupled to the surface of the handle body, the embodiment of the present disclosure can acquire the tracking information obtained by tracking the handle controller in the first time period, wherein the tracking information includes: the pose information, the position information and the acceleration, then the motion information of the handle controller in the second time period is predicted according to the above-mentioned tracking information and the acceleration, wherein the second time period is located after the first time period, and finally, the parameter values of the light-emitting parameters of the plurality of light-emitting units in the second time period are adjusted according to the motion information, so as to adjust the power consumption on the handle controller, in this way, under the premise of not affecting the normal use of the handle controller by the user, the heat generated on the handle controller is reduced by adjusting the power consumption of the handle controller, such that the heat generated on the handle controller can be adapted to the needs of miniaturization design.

The present disclosure can be a system, a method and/or a computer program product. The computer program product can include a computer readable storage medium, on which computer readable program instructions for enabling a processor to implement various aspects of the present invention are loaded.

The computer readable storage medium can be a tangible device that can hold and store instructions used by an instruction execution device. The computer readable storage medium can be, for example, but not limited to, an electrical storage device, a magnetic storage device, an optical storage device, an electromagnetic storage device, a semiconductor storage device, or any suitable combination of the above-mentioned devices. More specific examples (non-exhaustive list) of the computer readable storage medium include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical encoding device, for example, a protruding structure in a punched card or a groove on which instructions are stored, and any suitable combination of the above-mentioned devices. The computer readable storage medium used here is not interpreted as a transient signal itself, such as radio waves or other freely propagating electromagnetic waves, electromagnetic waves propagating through waveguides or other transmission media (for example, optical pulses transmitted by optical fiber cables), or electrical signals transmitted by electrical wires.

The computer readable program instructions described herein can be downloaded from the computer readable storage medium to various computing/processing devices, or downloaded to an external computer or an external storage device via a network, such as the Internet, a local area network, a wide area network, and/or a wireless network. The network can include a copper transmission cable, an optical fiber transmission cable, a wireless transmission cable, a router, a firewall, a switch, a gateway computer, and/or an edge server. A network adapter card or a network interface in each computing/processing device receives the computer readable program instructions from the network, and forwards the computer readable program instructions for storage in the computer readable storage medium in each computing/processing device.

Computer program instructions used for executing the operations of the present invention can be assembly instructions, instruction set architecture (ISA) instructions, machine instructions, machine-related instructions, microcodes, firmware instructions, state setting data, or source codes or object codes written in any combination of one or more programming languages, and the programming language includes an object-oriented programming language such as Smalltalk, C++, and the like, and a conventional procedural programming language such as the "C" language or similar programming languages. The computer readable program instructions can be completely executed on a user computer, partially executed on the user computer, executed as independent software packages, partially executed on the user computer and partially executed on a remote computer, or completely executed on the remote computer or a server. In a case involving the remote computer, the remote computer can be connected to the user computer through any kind of network, including a local area network (LAN) or a wide area network (WAN), or, it can be connected to the external computer (for example, connected via the Internet by using an Internet service provider. In some embodiments, an electronic circuit, such as a programmable logic circuit, a field programmable gate array (FPGA), or a programmable logic array (PLA), is customized by using the state information of the computer readable program instructions, and the electronic circuit can execute the computer readable program instructions, so as to implement various aspects of the present invention.

Here, various aspects of the present invention are described with reference to flow diagrams and/or block diagrams of the method, the apparatus (system) and the computer program product according to the embodiments of the present invention. It should be understood that, each block of the flow diagrams and/or block diagrams, and the combinations of various blocks in the flow diagrams and/or the block diagrams can be implemented by the computer readable program instructions.

These computer readable program instructions can be provided to the processors of general-purpose computers, special-purpose computers or other programmable data processing apparatuses, so as to produce a machine, in this way, these instructions, when executed by the processors of the computers or the other programmable data processing apparatuses, generate apparatuses for implementing functions/actions specified in one or more blocks in the flow diagrams and/or the block diagrams. These computer readable program instructions can also be stored in the computer readable storage medium, these instructions make the computers, the programmable data processing apparatuses, and/or other devices work in specific manners, thus, the computer readable medium storing the instructions includes a manufacture, which includes instructions for implementing various aspects of the functions/actions specified in one or more blocks in the flow diagrams and/or the block diagrams.

The computer readable program instructions can also be loaded on the computers, the other programmable data processing apparatuses or the other devices, such that a series of operation steps are executed on the computers, the other programmable data processing apparatuses or the other devices, so as to generate processes implemented by the computers, and thus the instructions executed on the computers, the other programmable data processing apparatuses or the other devices implement the functions/actions specified in one or more blocks in the flow diagrams and/or the block diagrams.

The flow diagrams and the block diagrams in the drawings show possible implementation architecture, functions and operations of the system, the method and the computer program product according to a plurality of embodiments of the present invention. In this regard, each block in the flow diagrams or the block diagrams can represent a part of a module, a program segment or an instruction, and the part of the module, the program segment or the instruction contains one or more executable instructions for implementing specified logic functions. In some alternative implementations, the functions marked in the block can also occur in a different order than the order marked in the drawings. For example, two consecutive blocks can actually be executed substantially in parallel, or they can sometimes be executed in a reverse order, which depends on the functions involved. It should also be noted that, each block in the block diagrams and/or the flow diagrams, and the combination of the blocks in the block diagrams and/or flow diagrams can be implemented by a dedicated hardware-based system that is used for executing specified functions or actions, or can be implemented by a combination of dedicated hardware and computer instructions. It is well known to those skilled in the art that, implementation through hardware, implementation through software, and implementation through a combination of software and hardware are all equivalent.

Various embodiments of the present invention have been described above, and the above descriptions are exemplary, not exhaustive, and are not limited to the disclosed embodiments. Without departing from the scope and spirit of the described embodiments, many modifications and changes are obvious to those of ordinary skill in the art. The choice of the terms used herein is intended to best explain the principles of the various embodiments, practical applications, or technical improvements on the market, or to enable others of ordinary skill in the art to understand the various embodiments disclosed herein. The scope of the present invention is defined by the appended claims.

The invention claimed is:

1. A control method for a handle controller, which is applied to a head mounted display used in conjunction with the handle controller, wherein the handle controller comprises: a handle body and a plurality of light-emitting units coupled to a surface of the handle body, and the method comprises:

acquiring tracking information obtained by tracking the handle controller in a first time period, wherein the tracking information comprises: pose information, position information and acceleration;

predicting motion information of the handle controller in a second time period according to the tracking information, wherein the second time period is after the first time period, and wherein the predicting motion information comprises obtaining a motion speed of the handle controller according to first position information at a first time point and second position information at a second time point different from the first time point in the first time period, and predicting the motion information of the handle controller in the second time period according to the motion speed, the position information and the acceleration of the handle controller; and adjusting parameter values of light-emitting parameters of the plurality of light-emitting units in the second time period according to the motion information.

2. The control method for a handle controller according to claim 1, wherein the motion information comprises: a motion position, and the light-emitting parameters comprise: a light-emitting time length;

adjusting the parameter values of the light-emitting parameters of the plurality of light-emitting units in the second time period according to the motion information comprises:

acquiring a tracking distance between a preset reference point in the head mounted display and the motion position;

acquiring, according to the tracking distance and a preset corresponding relationship between a distance range and the light-emitting time length, a target light-emitting time length corresponding to a target distance range in which the tracking distance falls, wherein in the preset corresponding relationship between the distance range and the light-emitting time length, the light-emitting time length corresponding to each distance range is less than or equal to the light-emitting time length of the plurality of light-emitting units under each condition that the head mounted display has tracked the handle controller under the distance range; and adjusting the light-emitting time length of the plurality of light-emitting units to the target light-emitting time length in the second time period.

3. The control method for a handle controller according to claim 2, wherein a length of the distance range is less than or equal to 30 cm.

4. The control method for a handle controller according to claim 1, wherein the motion information comprises: a target angle between a first direction in which a preset reference point in the head mounted display points to the handle controller and a second direction in which a front surface of a display screen in the head mounted display points to a back surface of the display screen; and adjusting the parameter values of the light-emitting parameters of the plurality of light-emitting units in the second time period according to the motion information comprises:

in a case where the target angle is within a preset hidden viewing angle range, adjusting the light-emitting time length of the plurality of light-emitting units to zero in the second time period.

5. The control method for a handle controller according to claim 4, wherein the preset hidden viewing angle range is 200° to 360°.

6. The control method for a handle controller according to claim 1, wherein the motion information comprises: the motion speed; and adjusting the parameter values of the light-emitting parameters of the plurality of light-emitting units in the second time period according to the motion information comprises: in a case where the motion speed is less than a preset speed threshold, reducing light-emitting frequency of the plurality of light-emitting units.

7. The control method for a handle controller according to claim 6, wherein reducing the light-emitting frequency of the plurality of light-emitting units comprises:

reducing the light-emitting frequency of the plurality of light-emitting units to preset frequency, wherein a frequency range of the preset frequency is 0 HZ to 15 HZ.

8. A head mounted display, comprising a memory and a processor, wherein the memory is used for storing a computer program; and the processor is used for executing the computer program to implement a control method for a handle controller, which is applied to the head mounted display used in conjunction with the handle controller, wherein the handle controller comprises: a handle body and a plurality of light-emitting units coupled to a surface of the handle body, and the method comprises:

acquiring tracking information obtained by tracking the handle controller in a first time period, wherein the tracking information comprises: pose information, position information and acceleration;

predicting motion information of the handle controller in a second time period according to the tracking information, wherein the second time period is after the first time period, and wherein the predicting motion information comprises obtaining a motion speed of the handle controller according to first position information at a first time point and second position information at a second time point different from the first time point in the first time period, and predicting the motion information of the handle controller in the second time period according to the motion speed, the position information and the acceleration of the handle controller; and adjusting parameter values of light-emitting parameters of the plurality of light-emitting units in the second time period according to the motion information.

9. The head mounted display according to claim 8, wherein the motion information comprises: a motion position, and the light-emitting parameters comprise: a light-emitting time length;

and wherein the processor is used for executing the computer program to adjust the parameter values of the light-emitting parameters of the plurality of light-emitting units in the second time period according to the motion information, by comprising:

acquiring a tracking distance between a preset reference point in the head mounted display and the motion position;

acquiring, according to the tracking distance and a preset corresponding relationship between a distance range and the light-emitting time length, a target light-emitting time length corresponding to a target distance range in which the tracking distance falls, wherein in the preset corresponding relationship between the distance range and the light-emitting time length, the light-emitting time length corresponding to each distance range is less than or equal to the light-emitting time length of the plurality of light-emitting units under each condition that the head mounted display has tracked the handle controller under the distance range; and adjusting the light-emitting time length of the plurality of light-emitting units to the target light-emitting time length in the second time period.

10. The head mounted display according to claim 9, wherein a length of the distance range is less than or equal to 30 cm.

11. The head mounted display according to claim 8, wherein the motion information comprises: a target angle between a first direction in which a preset reference point in the head mounted display points to the handle controller and a second direction in which a front surface of a display screen in the head mounted display points to a back surface of the display screen; and and wherein the processor is used for executing the computer program to adjust the parameter values of the light-emitting parameters of the plurality of light-emitting units in the second time period according to the motion information, by comprising:

in a case where the target angle is within a preset hidden viewing angle range, adjusting the light-emitting time length of the plurality of light-emitting units to zero in the second time period.

12. The head mounted display according to claim 11, wherein the preset hidden viewing angle range is 200° to 360°.

13. The head mounted display according to claim 8, wherein the motion information comprises: the motion speed; and wherein the processor is used for executing the computer program to adjust the parameter values of the light-emitting parameters of the plurality of light-emitting units in the second time period according to the motion information, by comprising:

in a case where the motion speed is less than a preset speed threshold, reducing light-emitting frequency of the plurality of light-emitting units.

14. The head mounted display according to claim 13, wherein the processor is used for executing the computer program to reduce the light-emitting frequency of the plurality of light-emitting units by comprising:

reducing the light-emitting frequency of the plurality of light-emitting units to preset frequency, wherein a frequency range of the preset frequency is 0 HZ to 15 HZ.

15. A non-transitory computer readable storage medium, wherein a computer program is stored on the computer readable storage medium, and when executed by a processor, the computer program implements a control method for a handle controller, which is applied to a head mounted display used in conjunction with the handle controller, wherein the handle controller comprises: a handle body and a plurality of light-emitting units coupled to a surface of the handle body, and the method comprises:

acquiring tracking information obtained by tracking the handle controller in a first time period, wherein the tracking information comprises: pose information, position information and acceleration;

predicting motion information of the handle controller in a second time period according to the tracking information, wherein the second time period is after the first time period, and wherein the predicting motion information comprises obtaining a motion speed of the handle controller according to first position information at a first time point and second position information at a second time point different from the first time point in the first time period, and predicting the motion information of the handle controller in the second time period according to the motion speed, the position information and the acceleration of the handle controller; and adjusting parameter values of light-emitting parameters of the plurality of light-emitting units in the second time period according to the motion information.

16. The non-transitory computer readable storage medium according to claim 15, wherein the motion information comprises: a motion position, and the light-emitting parameters comprise: a light-emitting time length;

and wherein the computer program, when executed by a processor, implements adjusting the parameter values of the light-emitting parameters of the plurality of light-emitting units in the second time period according to the motion information, by comprising:

acquiring a tracking distance between a preset reference point in the head mounted display and the motion position;

acquiring, according to the tracking distance and a preset corresponding relationship between a distance range and the light-emitting time length, a target light-emitting time length corresponding to a target distance range in which the tracking distance falls, wherein in the preset corresponding relationship between the distance range and the light-emitting time length, the light-emitting time length corresponding to each distance range is less than or equal to the light-emitting time length of the plurality of light-emitting units under each condition that the head mounted display has tracked the handle controller under the distance range; and adjusting the light-emitting time length of the plurality of light-emitting units to the target light-emitting time length in the second time period.

17. The non-transitory computer readable storage medium according to claim 16, wherein a length of the distance range is less than or equal to 30 cm.

18. The non-transitory computer readable storage medium according to claim 15, wherein the motion information comprises: a target angle between a first direction in which a preset reference point in the head mounted display points to the handle controller and a second direction in which a front surface of a display screen in the head mounted display points to a back surface of the display screen; and and wherein the computer program, when executed by a processor, implements adjusting the parameter values of the light-emitting parameters of the plurality of light-emitting units in the second time period according to the motion information, by comprising:

in a case where the target angle is within a preset hidden viewing angle range, adjusting the light-emitting time length of the plurality of light-emitting units to zero in the second time period.

19. The non-transitory computer readable storage medium according to claim 18, wherein the preset hidden viewing angle range is 200° to 360°.

* * * * *